T. KINGSFORD.
Starch Machine.
No. 40,693. Patented Nov. 24, 1863.
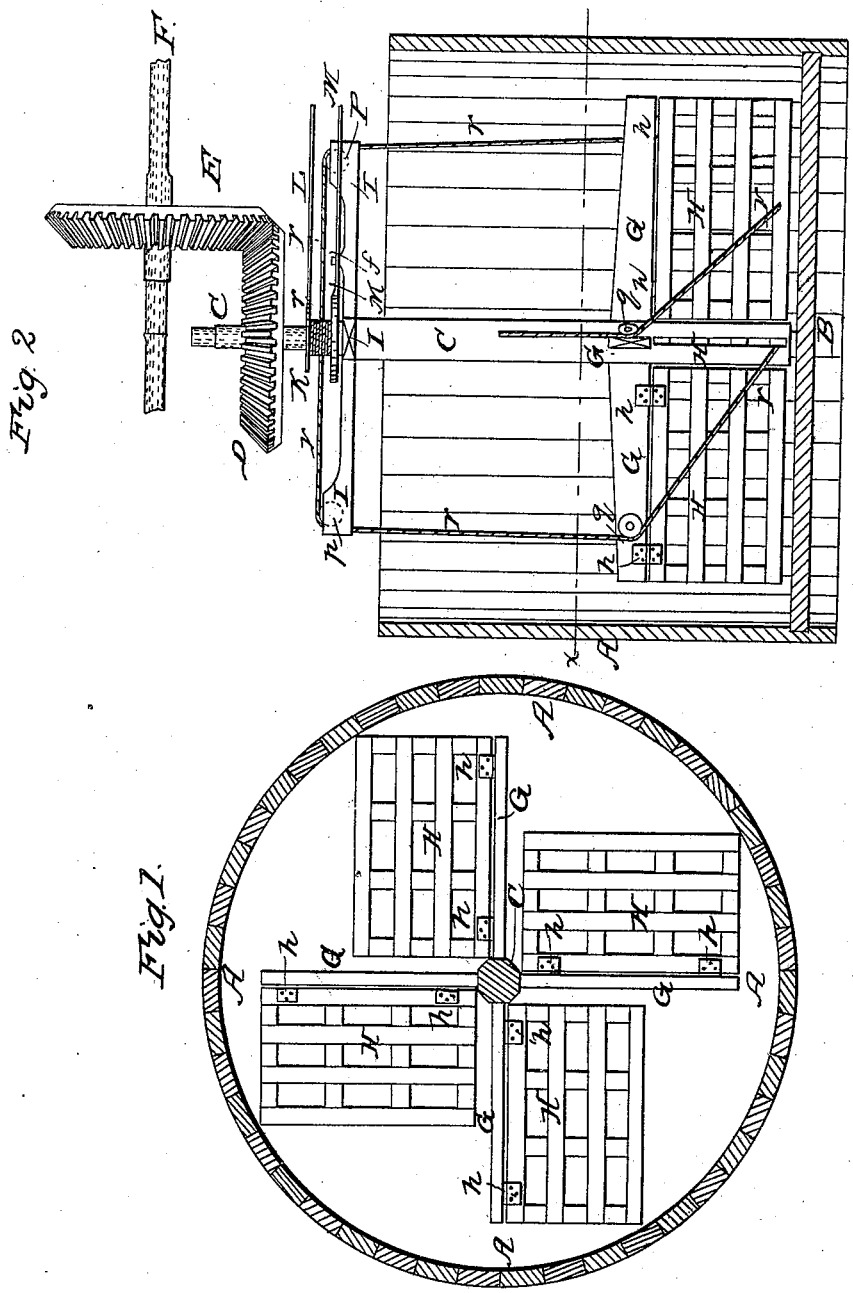

UNITED STATES PATENT OFFICE.

THOMSON KINGSFORD, OF OSWEGO, NEW YORK.

IMPROVEMENT IN MACHINERY FOR THE MANUFACTURE OF STARCH.

Specification forming part of Letters Patent No. 40,693, dated November 24, 1863.

*To all whom it may concern:*

Be it known that I, THOMSON KINGSFORD, of the city and county of Oswego, in the State of New York, have invented a new and useful Machine for Washing Up Starch Deposits; and I do hereby declare the following to be a full and correct description of the same, reference being had to the accompanying drawings, in which—

Figure 1 is a horizontal section of the apparatus at line $x\,x$ of Fig. 2; and Fig. 2 is a side elevation of the washing apparatus, the cistern or tank being shown in section.

The nature of my invention consists in washing up the deposited starch into suspension in the supernatant water by means of a violent agitation of that fluid, produced by an adjustable revolving gate or wing moving just above the surface of the impacted or cohering starch, and capable of ready accommodation to its depth in the containing-vessel, all as hereinafter more particularly set forth, the said invention being generically different and carefully to be distinguished from all devices for forcing the deposited starch into suspension by stirring, raking, digging, or other equivalent modes of effecting the same object by the actual mechanical contact of parts of the machinery or apparatus with the starch to be operated upon.

In the manufacture of starch it is passed through a series of washings, to separate and cleanse it from the foreign matters and impurities with which it may be mingled, and for this purpose it is, while suspended in water, run into tubs or vats, where the starch settles to the bottom and forms a coherent and impacted mass. The supernatant water is then drawn off, carrying away in solution the more readily soluble foreign matters; but impurities less easily dissolved still remain commingled with the deposited mass of starch. To remove them this mass must be again suspended in pure water, and the process repeated until all impurities are washed away. To bring this mass again into suspension, starch-manufacturers have resorted to the use of rakes and other equivalent instruments for the purpose of digging and cutting up the deposits, thus subjecting the machinery to unequal strains and jars, and performing the operation in a slow, expensive, and inefficient manner. They evidently overlooked the principle which lies at the foundation of my invention, that starch deposits, though firm and solid, are yet of such a nature as to be readily disintegrated and caused to diffuse themselves in water by passing a rapid current of that liquid over their surface. The application of this principle to practice constitutes the essence of my invention.

To enable others to make and use my improved machine or apparatus, I will proceed to describe its construction and operation, referring to the drawings, where the same part is marked in both figures by the same letter of reference.

A marks the sides of the tank or vessel in which the starch to be washed is placed; B, the bottom of said vessel, on the center of which is stepped the main shaft C, on the upper end of which is fixed the bevel-wheel D, which receives motion from the bevel-wheel E on shaft F, which is driven by any suitable prime mover. From the shaft C project four stout arms, G, to which are hinged by hinges $h$ the gates H, which open upward, and are all attached on the same side of the arms G, respectively. They are made of wood, so that their tendency is to float upon the surface of water which may be placed in the tank. Attached to each gate, near the middle of its lowermost rail, is a rope, $r$, which passes to a pulley, $q$, on the arm G, immediately in front of the gate, and thence up to and over a pulley, $p$, on the arm I, to the spool K, around which its upper end is wound. The arms I are fixed to the upper end of shaft C. The spool K is placed on the upper and cylindrical portion of shaft C, on which it is capable of turning. An arm, L, projects from the spool K, as shown. A notched wheel forms the lower head of the spool, into which plays a lever-pawl, M, having its fulcrum at $f$.

The operation is as follows: The starch to be washed is placed in the tank A with a proper quantity of water. The gates H are left free and float upon the top of the water. The starch soon settles to the bottom in a solid mass, which requires to be washed up into thorough admixture with the water, in order to the removal of the impurities which it contains. To effect this I draw down the gates till their lower sides are very nearly in contact with the upper surface of the starch deposit. This I effect by holding the arm L stationary while the shaft C revolves, which causes the ropes r to wind themselves on the spool K and draw the gates downward. The lever-pawl M, when thrown into a notch of the lower wheel of the spool, holds the gates in any desired position by preventing the spool from unwinding. To release the gates the pawl is lifted from the notches of the ratchet-wheel. When the gates are drawn down to the proper position, rapid motion is imparted to the main shaft C, and the water in the tank is caused to pass swiftly over the surface of the deposited starch, which it causes to rise in suspension. As the starch washes up, the gates are drawn down until, when all the starch is washed up into suspension in the water of the tank, the gates assume a vertical position, as shown in Fig. 2. They are then released by throwing the pawl out of the ratchet-wheel, holding the spool stationary, and reversing the motion by which the ropes were wound upon it. When free, the gates float on the water, and the starch again settles to the bottom of the tank. The supernatant water, in which the impurities remain suspended or dissolved, is then drawn off, fresh water added, and the operation repeated as often as may be found necessary.

Having thus fully described my invention and one mode of carrying it into practice, I do not limit myself to any specific form of apparatus, various forms being applicable without any departure from the principle of my improvement; but

What I claim, and desire to secure by Letters Patent, is—

The washing up of starch deposits by causing a current or currents of water to pass rapidly over their surface by means of a revolving wing or gate moving just above the surface of the impacted or cohering starch, and capable of ready adjustment to its depth in the containing-vessel, substantially in the manner hereinbefore described.

The above specification of my said invention signed and witnessed, at Washington, this 9th day of May, A. D. 1863.

THOMSON KINGSFORD.

Witnesses:
CHAS. F. STANSBURY,
D. LOUGHLIN.